J. S. CLARKE.
TIRE AND TIRE CARRYING RIM FOR THE WHEELS OF MOTOR CARS, &c.
APPLICATION FILED NOV. 13, 1909.
987,344. Patented Mar. 21, 1911.
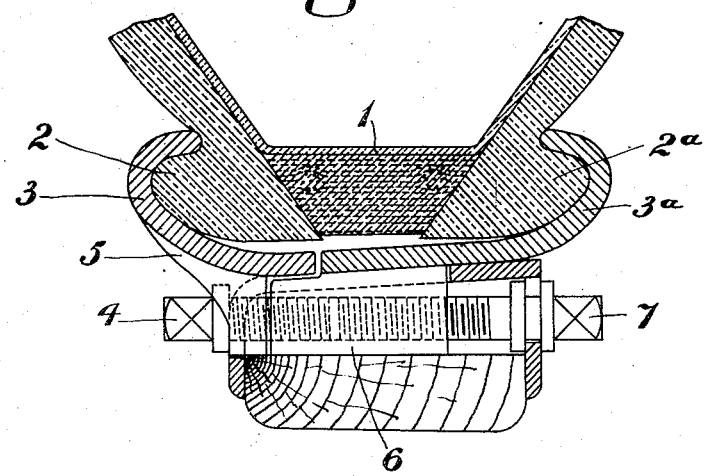
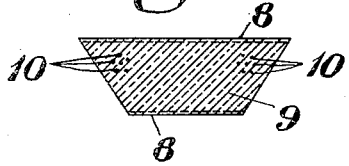
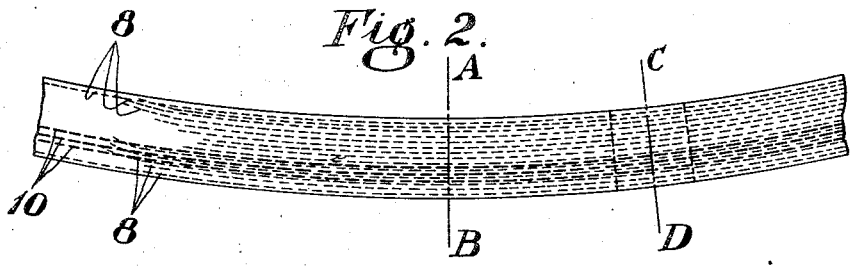
James Sealy Clarke
Inventor
Witnesses

UNITED STATES PATENT OFFICE.

JAMES SEALY CLARKE, OF LONDON, ENGLAND.

TIRE AND TIRE-CARRYING RIM FOR THE WHEELS OF MOTOR-CARS, &c.

987,344.  Specification of Letters Patent.  Patented Mar. 21, 1911.

Application filed November 13, 1909. Serial No. 527,803.

*To all whom it may concern:*

Be it known that I, JAMES SEALY CLARKE, a subject of the King of Great Britain and Ireland, residing at London, England, (whose post-office address is 77-79 Cannon street, in the city and county of London, England,) have invented Improvements Relating to Tires and Tire-Carrying Rims for the Wheels of Motor-Cars and other Vehicles; and I do hereby declare the following to be a full, clear, and exact description of the invention, such as will enable others skilled in the art to which it appertains to make and use the same.

This invention relates to tires and tire-carrying rims for the wheels of motor cars and other vehicles, and more particularly to an improved construction of what is known as a "security band." As is well known annular security bands are sometimes employed with circumferentially divisible tire carrying rims, or with rims having detachable flanges, instead of the security bolts usually employed with solid or undivided rims. Various forms of such bands have been heretofore proposed, some for instance made of metal, some of india rubber only, and others of india rubber and fabric either with or without a metal insertion.

The present invention has for its object an improved construction of security band which while being substantially incompressible in a lateral direction shall at the same time be flexible and inextensible longitudinally.

According to this invention the security band is formed of a plurality of concentrically disposed layers of canvas and of india-rubber vulcanized together, and the band is rendered inextensible by the insertion in it during manufacture of hoops of piano wire. The band is formed endless and a hole is made through it to accommodate the valve tube. The band is suitably reinforced near the valve hole. The band is made wedge shaped in cross section and the piano wire is placed near the edges of the upper side or wider portion thereof and passes on either side of the valve hole. Each of the piano wire hoops consists of a single strand wound into several convolutions under even tension and the two ends are securely joined together.

The construction of a band according to this invention is illustrated by the accompanying drawing in which,—

Figure 1 is a cross sectional elevation of the security band shown applied to a tire mounted in a detachable and divisible rim the band being cut at about the line A—B Fig. 2. Fig. 2 is a side elevation of a portion of the security band detached from a tire and rim, the inner periphery of the band being here shown uppermost. Fig. is a cross sectional elevation of the band at the valve hole and taken on the line C—D Fig. 2, the outer periphery of the band being uppermost, and Fig. 4 is a cross sectional elevation of the band as it is preferably constructed throughout the greater portion of its length.

Like reference numerals indicate like parts in the several figures of the drawing Referring to the drawing, 1 is the security band, 2. 2ª the edges of the tire cover and 3ª the sections of a divisible tire carrying rim. As shown in Fig. 1, the rim sections are held together by a bolt 4 passing through a lug 5 on the rim section 3 and taking into a threaded hole in a lug 6 on the rim section 3ª. The rim as a whole is moved to and from its position on the wheel, and held in place thereon, by a jack-bolt 7. The particular construction of the rim sections and securing means forms no part of the present invention and is only shown to clearly illustrate the application of the security band forming the invention to a tire and rim.

The security band 1, forming the subject of this invention, is formed as shown of concentrically disposed layers of canvas 8 and of india-rubber 9 of suitable density vulcanized together, and it is rendered inextensible by the insertion in it during manufacture of piano wire hoops 10. Any number of alternate layers of canvas and india-rubber may be used and all the layers of canvas may extend through the whole length of the band, or only some of them may so extend the remainder extending only for some distance on either side of the valve hole and terminating at say 8 to 10 inches therefrom The band is wedge shaped in cross section and in the construction shown in the drawing the major portion of the band consists of india-rubber with a layer of canvas at or near the inner and outer peripheries of the band the band at the valve hole having several additional reinforcing layers of canvas extending for some inches on either side of the valve hole and being intermediate of the layers extending throughout the whole length of the band. The two hoops of piano wire 10, inserted in the band during manufacture, consist each of several convolutions of a single strand wound under even tension, and are located near or toward the outer corners or outer peripheral edges of the band and pass on either side of the valve hole as shown, the ends of the wire forming each hoop being securely joined together in any suitable or known manner.

The band when in use is placed between the edges 2, 2ª of the tire cover and is of a diameter just sufficiently larger than the bed of the rim that it can be put into position with the tire and air tube when one side or flange 3 of the rim is removed. As the band is inextensible and substantially incompressible, when the two parts of the rim are drawn together by the bolts 4 or other securing means said band will wedge the beads of the outer cover tightly under or into the edges or lips of the rim section 3, 3ª and at the same time form a water-tight joint between such band and the outer cover and thus keep moisture away from the inner tube.

Any of the well known or suitable alternatives for india-rubber, canvas and piano wire may be combined in the manner set forth above in the manufacture of a security band without departing from the object of this invention.

What I claim as my invention and desire to secure by Letters Patent is:—

A security band for fastening pneumatic tires, consisting of an inextensible and substantially incompressible body comprising a plurality of concentric layers of canvas and india-rubber vulcanized together, and metallic reinforcing hoops incorporated in the band body during the manufacture thereof and arranged at points adjacent to the lateral edges and the wide face thereof, said hoops each being formed of a single wire strand wound into loops or convolutions under even tension.

In testimony whereof I affix my signature, in the presence of two witnesses.

JAMES SEALY CLARKE.

Witnesses:
  BERTRAM C. BARTON,
  J. GROOM.